United States Patent
Chang

(10) Patent No.: US 10,699,327 B2
(45) Date of Patent: Jun. 30, 2020

(54) INFORMATION PROCESSING APPARATUS, CONTROL METHOD, AND PROGRAM

(71) Applicant: RAKUTEN, INC., Tokyo (JP)

(72) Inventor: Qing Chang, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 243 days.

(21) Appl. No.: 15/529,805

(22) PCT Filed: Nov. 28, 2014

(86) PCT No.: PCT/JP2014/081581
§ 371 (c)(1),
(2) Date: May 25, 2017

(87) PCT Pub. No.: WO2016/084236
PCT Pub. Date: Jun. 2, 2016

(65) Prior Publication Data
US 2017/0330268 A1  Nov. 16, 2017

(51) Int. Cl.
*G06Q 30/06* (2012.01)
*G06Q 10/08* (2012.01)
*G06Q 10/06* (2012.01)

(52) U.S. Cl.
CPC ....... *G06Q 30/0635* (2013.01); *G06Q 10/087* (2013.01); *G06Q 10/06* (2013.01); *G06Q 10/06311* (2013.01); *G06Q 30/0641* (2013.01)

(58) Field of Classification Search
CPC . G06Q 10/087; G06Q 10/06; G06Q 10/06311
See application file for complete search history.

(56) References Cited

U.S. PATENT DOCUMENTS

| | | | |
|---|---|---|---|
| 2010/0106636 A1* | 4/2010 | Lutnick | G06Q 10/00 705/37 |
| 2012/0072431 A1* | 3/2012 | Berlener | G06Q 10/087 707/748 |
| 2014/0310196 A1 | 10/2014 | Yamamura | |
| 2016/0092969 A1* | 3/2016 | Gopalsamy | G06Q 30/0635 705/26.81 |

FOREIGN PATENT DOCUMENTS

JP    2013-114392 A    6/2013

OTHER PUBLICATIONS

International Search Report for PCT/JP2014/081581, dated Dec. 22, 2014 (PCT/ISA/210).

* cited by examiner

*Primary Examiner* — A. Hunter Wilder
(74) *Attorney, Agent, or Firm* — Sughrue Mion, PLLC

(57) ABSTRACT

An accumulator (101) accumulates, when an order for a commercial product is accepted, the accepted order being in association with an unprocessed status. An extractor (102) extracts, when a browsing request is received, the order with an order recipient that is a requester of the received request, the order being accumulated in association with the unprocessed status. A determiner (103) determines a priority of each of the extracted orders based on the order with a common orderer to the extracted order, the order being accumulated in association with a status other than the unprocessed status. A presenter (104) presents the extracted orders to the requester in order of the determined priorities.

10 Claims, 10 Drawing Sheets

FIG. 5

ORDER HISTORY TABLE 603a

| 603a1 | 603a2 | 603a3 | 603a4 | 603a5 | 603a6 | 603a7 |
|---|---|---|---|---|---|---|
| ORDER ID | ORDER RECIPIENT (STORE ID) | ORDERER (CUSTOMER ID) | ORDER TIME AND DATE | COMMERCIAL PRODUCT ID | PURCHASED AMOUNT | PROCESS STATUS |
| WWW | X1 | A1 | 2014/12/1 10:00:00 | aaa | 3000 YEN | UNPROCESSED |
| WWY | X1 | A1 | 2014/12/1 10:05:00 | bbb | 15000 YEN | UNPROCESSED |
| WWZ | X1 | A2 | 2014/12/1 10:10:00 | aaa | 2000 YEN | UNPROCESSED |
| WYY | X1 | A3 | 2014/12/1 10:15:00 | ccc | 4000 YEN | UNPROCESSED |
| : | : | : | : | : | : | : |
| WUZ | X1 | A1 | 2014/11/30 12:00:00 | ddd | 3000 YEN | PROCESSED |
| : | : | : | : | : | : | : |
| WKY | X2 | A1 | 2014/12/1 10:00:00 | eee | 1000 YEN | UNPROCESSED |
| : | : | : | : | : | : | : |
| WOU | X2 | A1 | 2014/10/1 12:00:00 | bbb | 1000 YEN | PROCESSED |
| : | : | : | : | : | : | : |
| WUU | X3 | A1 | 2014/10/11 12:00:00 | aaa | 1000 YEN | CANCELED |
| : | : | : | : | : | : | : |

FIG. 6

UNPROCESSED ORDER TABLE 603b

| 603b1 | 603b2 | 603b3 | 603b4 | 603b5 | 603b6 |
|---|---|---|---|---|---|
| PRIORITY | ORDER ID | ORDERER (CUSTOMER ID) | ORDER TIME AND DATE | COMMERCIAL PRODUCT ID | PURCHASED AMOUNT |
| 1 | WWZ | A2 | 2014/12/1 10:05:00 | aaa | 2000 YEN |
| 2 | WYY | A3 | 2014/12/1 10:10:00 | ccc | 4000 YEN |
| 3 | WWW | A1 | 2014/12/1 10:00:00 | aaa | 3000 YEN |
| 4 | WWY | A1 | 2014/12/1 10:05:00 | bbb | 15000 YEN |
| : | : | : | : | : | : |

INFORMATION PROCESSING APPARATUS, CONTROL METHOD, AND PROGRAM

CROSS REFERENCE TO RELATED APPLICATIONS

This application is a National Stage of International Application No. PCT/JP2014/081581 filed Nov. 28, 2014, the contents of all of which are incorporated herein by reference in their entirety.

TECHNICAL FIELD

The present disclosure relates to an information processing apparatus, a control method, and a program, and more specifically, to reviewing of an order placed in electronic commerce.

BACKGROUND ART

Conventionally, electronic markets that permit purchase and sale of commercial products over the Internet are known. A shopping server that manages electronic markets accepts, from multiple customers, orders for commercial products, and transfers the accepted orders to a store that is selling such commercial products. Although orders are provided to the store in a substantially real-time manner, the store does not immediately execute a shipping process, and the like, upon receiving orders, instead the orders are typically processed at an arbitrary timing convenient for the store.

For example, Patent Literature 1 discloses that when receiving an order for a commercial product from a user terminal 8, an electronic mall server 2 transmits delivery request information to a delivery-service server 3, and the delivery-service server 3 transmits shipping request information to the store.

CITATION LIST

Patent Literature

Patent Literature 1: Unexamined Japanese Patent Application Kokai Publication No. 2013-114392

SUMMARY OF INVENTION

Technical Problem

When orders are processed at an arbitrary timing convenient for the store as explained above, it is greater convenience for the store to be presented with orders at a time that is convenient for the store and in accordance with a priority of the order, rather than to be presented with orders in real-time in the order that they are received.

The present disclosure has been made to solve the aforementioned technical problem, and an objective of the present disclosure is to provide an information processing apparatus, a control method, and a program that are suitable and highly convenient for a store for presenting orders.

Solution to Problem

An information processing apparatus according to a first aspect of the present disclosure includes:

an accumulator that accumulates, when an order for a commercial product is accepted, the accepted order being in association with an unprocessed status;

an extractor that extracts, when a browsing request is received, the order with an order recipient that is a requester of the received request, the order being accumulated in association with the unprocessed status;

a determiner that determines a priority of each of the extracted orders based on the order with a common orderer to the extracted order, the order being accumulated in association with a status other than the unprocessed status; and a presenter that presents the extracted orders to the requester in order of the determined priorities.

In the above information processing apparatus, the determiner determines the priority of each of the extracted orders based on a similarity between the order with the common orderer and the common order recipient to the extracted order, and the extracted order, the order being accumulated in association with the status other than the unprocessed status.

The above information processing apparatus further includes an updater that updates the status associated with the order already processed by the requester among the presented orders to a processed status.

In the above information processing apparatus, the determiner determines the priority of each of the extracted orders based on a frequency of the order with the common orderer to the extracted order, the order being accumulated in association with the processed status.

In the above information processing apparatus, the determiner determines the priority of each of the extracted orders based on a frequency of the order with the common orderer and the common order recipient to the extracted order, the order being accumulated in association with the processed status.

The above information processing apparatus further includes an updater that updates the status associated with a canceled order among the accumulated orders in association with the unprocessed status to a canceled status.

In the above information processing apparatus, the determiner determines the priority of each of the extracted orders based on an infrequency of the order with the common orderer to the extracted order, the order being accumulated in association with the canceled status.

In the information processing apparatus, the determiner determines the priority of each of the extracted orders based on an infrequency of the order with the common orderer and the common order recipient to the extracted order, the order being accumulated in association with the canceled status.

A control method according to a second aspect of the present disclosure includes:

accumulating, when an order for a commercial product is accepted, the accepted order being in association with an unprocessed status;

extracting, when a browsing request is received, the order with an order recipient that is a requester of the received request, the order being accumulated in association with the unprocessed status;

determining a priority of each of the extracted orders based on the order with a common orderer to the extracted order, the order being accumulated in association with a status other than the unprocessed status; and presenting the extracted orders to the requester in order of the determined priorities.

A program according to a third aspect of the present disclosure is to cause a computer to function as:
   an accumulator that accumulates, when an order for a commercial product is accepted, the accepted order being in association with an unprocessed status;
   an extractor that extracts, when a browsing request is received, the order with an order recipient that is a requester of the received request, the order being accumulated in association with the unprocessed status;
   a determiner that determines a priority of each of the extracted orders based on the order with a common orderer to the extracted order, the order being accumulated in association with a status other than the unprocessed status; and
   a presenter that presents the extracted orders to the requester in order of the determined priorities.

Note that the above program may be recorded in a recording medium. This recording medium is a non-transitory recording medium, and can be distributed and sold independently from a computer. In this case, the term non-transitory recording medium means a tangible recording medium. An example of the non-transitory recording medium is a compact disc, a flexible disk, a hard disk, a magnet-optical disc, a digital video disk, a magnetic tape, a semiconductor memory, or the like. In addition, the term transitory recording medium means a transmission medium (propagation signal) itself. An example of the transitory recording medium is an electric signal, an optical signal, an electromagnetic wave, or the like. Note that the term temporary memory area refers to an area that temporarily stores data and a program, and is, for example, a non-volatile memory like a RAM (Random Access Memory).

Advantageous Effects of Invention

According to the present disclosure, an information processing apparatus, a control method, and a program that are suitable and highly convenient for a store for presenting orders can be provided.

BRIEF DESCRIPTION OF DRAWINGS

FIG. 5 is a diagram to explain an order history table;

FIG. 6 is a diagram to explain an unprocessed order table;

DESCRIPTION OF EMBODIMENTS

Embodiments of the present disclosure will be explained below. The following embodiments are merely for explanation, and are not intended to limit the scope of the present disclosure. Hence, a person skilled in the art is capable of employing an embodiment in which each component or all components are replaced with equivalents, and thus such an embodiment is also within the scope of the present disclosure.

(1. Overall Configuration)

Figure 1:
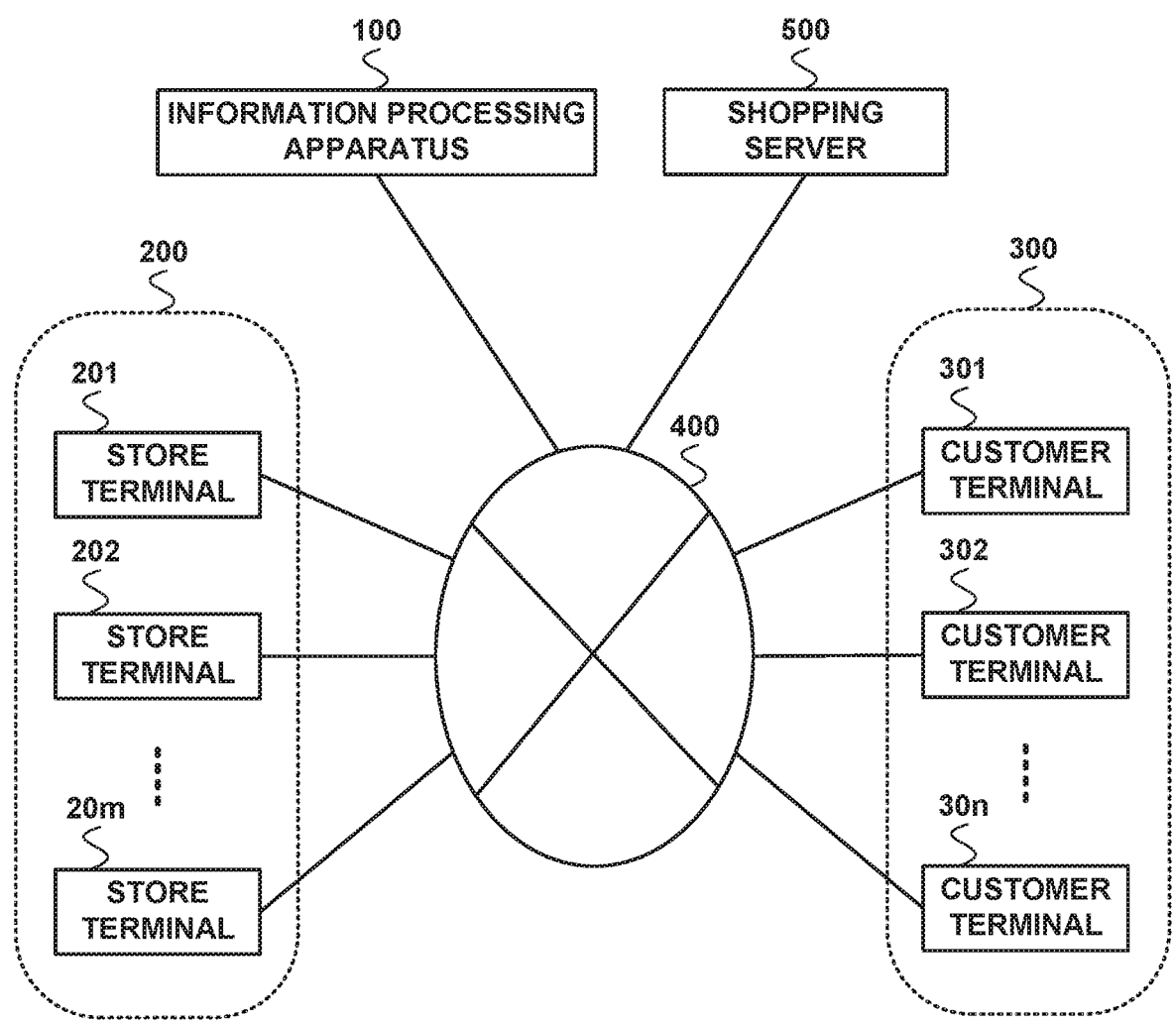
FIG. 1 is a diagram illustrating a relationship among an information processing apparatus, a store terminal, a customer terminal, and a shopping server according to embodiments of the present disclosure.

As illustrated in FIG. 1, an information processing apparatus 100 according to embodiments of the present disclosure is connected with an Internet 400. In addition to the information processing apparatus 100, store terminals 201, 202 to 20m (hereinafter, collectively referred to as "store terminal 200"), customer terminals 301, 302 to 30n (hereinafter, collectively referred to as "customer terminal 300"), and a shopping server 500 are connected with the Internet 400.

The shopping server 500 is an apparatus that manages an electronic market where commercial products and services are sold and purchased over the Internet.

The store terminal 200 is a terminal utilized in a store (seller) that is selling the commercial products in the electronic market.

The customer terminal 300 is a terminal utilized by a customer who browses and purchases commercial products available from the store.

The shopping server 500 registers information about a commercial product transmitted from the store terminal 200, and presents the registered information on the commercial product in response to a request from the customer terminal 300. In addition, the shopping server 500 accepts an order for the commercial product from the customer terminal 300, and transmits information on the order to the store terminal 200.

The information processing apparatus 100 accepts an order for the commercial product from the customer terminal 300, accumulates information on such an order, and presents the accumulated orders in response to a browsing request from the store terminal 200.

Note that the relationship between the information processing apparatus 100 and the shopping server 500 is not limited to the example illustrated in FIG. 1. For example, the information processing apparatus 100 may be directly connected with the shopping server 500, or the shopping server 500 and the information processing apparatus 100 may be constructed as a single apparatus.

Figure 2:
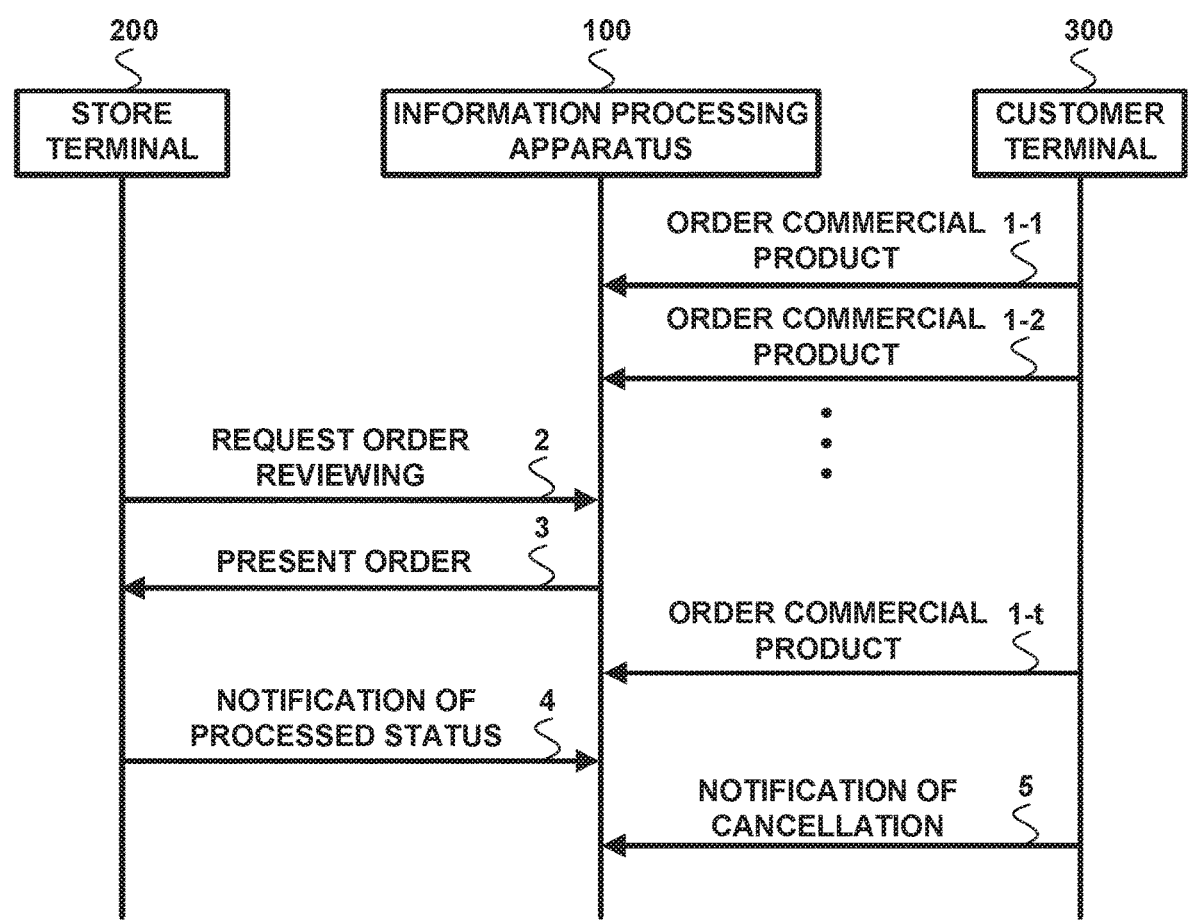
FIG. 2 is a diagram illustrating an example of a communication performed among the information processing apparatus, the store terminal, and the customer terminal.

FIG. 2 illustrates an example of a communication performed among the information processing apparatus 100, the store terminal 200, and the customer terminal 300 when an order from the customer terminal 300 and an order browsing request from the store terminal 200 are made according to the present disclosure.

The customer terminal 300 transmits an order for a commercial product available from a store in the electronic market to the information processing apparatus 100 (1-1 to 1-t (t: arbitrary value)). The information processing apparatus 100 accumulates the received order in a recording medium of the information processing apparatus 100, other recording media connected via the network, or the like.

The store terminal 200 transmits a browsing request for the accumulated orders to the information processing apparatus 100 (2).

The information processing apparatus 100 extracts, when receiving the browsing request from the store terminal 200, the orders to be presented to the store terminal 200 that has transmitted the request among the accumulated orders, obtains priorities of the orders, and presents the orders to the store terminal 200 in order of priorities (3).

In addition, when a process like shipping is executed with respect to the presented order, the store terminal 200 transmits a notification of process completion to the information processing apparatus 100 (4).

In addition, the customer terminal 300 transmits a notification of cancellation of the commercial product to the information processing apparatus 100 (5).

Note that the customer terminal 300 may directly transmit the notification of cancellation to the store terminal 200. In this case, the store terminal 200 that has received the notification of cancellation transmits the notification of cancellation to the information processing apparatus 100.

(2. General Configuration of Information Processing Apparatus)

An explanation will be given of a physical configuration of a typical information processing apparatus 600 that realizes the information processing apparatus 100 according to embodiments of the present disclosure.

Figure 3:
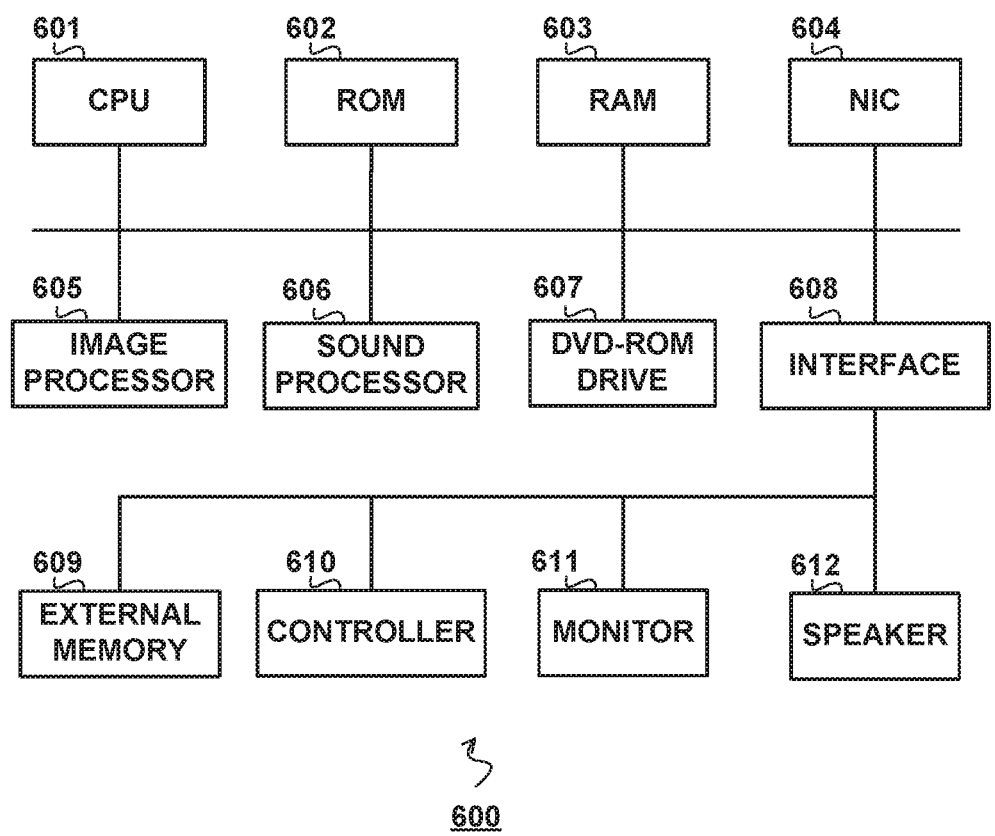
FIG. 3 is a diagram illustrating a physical configuration of a typical information processing apparatus that realizes the information processing apparatus according to the embodiments of the present disclosure.

As illustrated in FIG. 3, the information processing apparatus 600 includes a CPU (Central Processing Unit) 601, a ROM (Read Only Memory) 602, a RAM (Random Access Memory) 603, a NIC (Network Interface Card) 604, an image processor 605, a sound processor 606, a DVD-ROM (Digital Versatile Disc ROM) drive 607, an interface 608, an external memory 609, a controller 610, a monitor 611, and a speaker 612.

The CPU 601 controls the operation of the entire information processing apparatus 600, is connected with each component, and exchanges a control signal and data therewith.

The ROM 602 records an IPL (Initial Program Loader) to be executed right after a power activation, and when the IPL is executed, a predetermined program is read in the RAM 603, and the CPU 601 starts executing this program. In addition, the ROM 602 stores programs and various data on an operating system necessary to control the operation of the entire information processing apparatus 600.

The RAM 603 is to temporarily store data and programs, and stores programs and data read from the DVD-ROM, other data necessary for communication, and the like.

The NIC 604 is to connect the information processing apparatus 600 with a computer communication network like the Internet. The NIC 604 comprises an interface (not illustrated) that function as an intermediary between the CPU 601 and a device that complies to the 10BASE-T/100BASE-T standard that is used in building an LAN (Local Area Network), an analog modem, an ISDN (Integrated Services Digital Network) modem or an ADSL (Asymmetric Digital Subscriber Line) modem for connecting to the Internet using a telephone line, a cable modem for connecting to the Internet using a cable television line, or the like.

The image processor 605 processes data read from the DVD-ROM, or the like, by the CPU 601 or an image computing processor (not illustrated) of the image processor 605, and records the processed data in a frame memory (not illustrated) of the image processor 605. Image information recorded in the frame memory is converted into video signals at a predetermined synchronous timing, and is output to the monitor 611. Hence, various pages become displayable.

The sound processor 606 converts sound data read from the DVD-ROM, or the like into analog sound signals, and causes the speaker 612 connected with the sound processor to output sounds. In addition, under the control of the CPU 601, sound to be produced during the progress of a process executed by the information processing apparatus 600 is generated, and corresponding sound is output by the speaker 612.

A DVD-ROM to be loaded in the DVD-ROM drive 607 stores, for example, a program for realizing the information processing apparatus 100 of the embodiments. Under the control of the CPU 601, the DVD-ROM drive 607 executes a reading process on the loaded DVD-ROM to read the necessary program and data, and the read program and data are temporarily stored in the RAM 603, or the like.

The interface 608 is connected with the external memory 609, the controller 610, the monitor 611, and the speaker 612 in a freely detachable manner.

The external memory 609 stores data on personal information of the user or the like in a rewritable manner.

The controller 610 accepts an operation input given at the time of, for example, various settings for the information processing apparatus 600. The user of the information processing apparatus 600 inputs an instruction via the controller 610, and thus such data is recordable in the external memory 609 as needed.

The monitor 611 presents data output by the image processor 605 to the user of the information processing apparatus 600.

The speaker 612 presents sound data output by the sound processor 606 to the user of the information processing apparatus 600.

In addition, the information processing apparatus 600 can be configured to accomplish the same function as the ROM 602, the RAM 603, the external memory 609, the DVD-ROM loaded in the DVD-ROM drive 607, and the like, using a large-capacity external storage device like a hard disk.

An explanation will be given below of the information processing apparatus 100 that is realized by the aforementioned information processing apparatus 600 with reference to FIG. 1 to FIG. 10. Upon power activation of the information processing apparatus 600, the program that causes this information processing apparatus to function as the information processing apparatus 100 of the embodiments is executed, and thus the information processing apparatus 100 according to the embodiments is realized.

(3. Functional Configuration of Information Processing Apparatus According to First Embodiment)

The information processing apparatus of the first embodiment presents, to the store, accepted orders from the customers at a timing in accordance with a request from the store, and in order of priorities.

Figure 4:
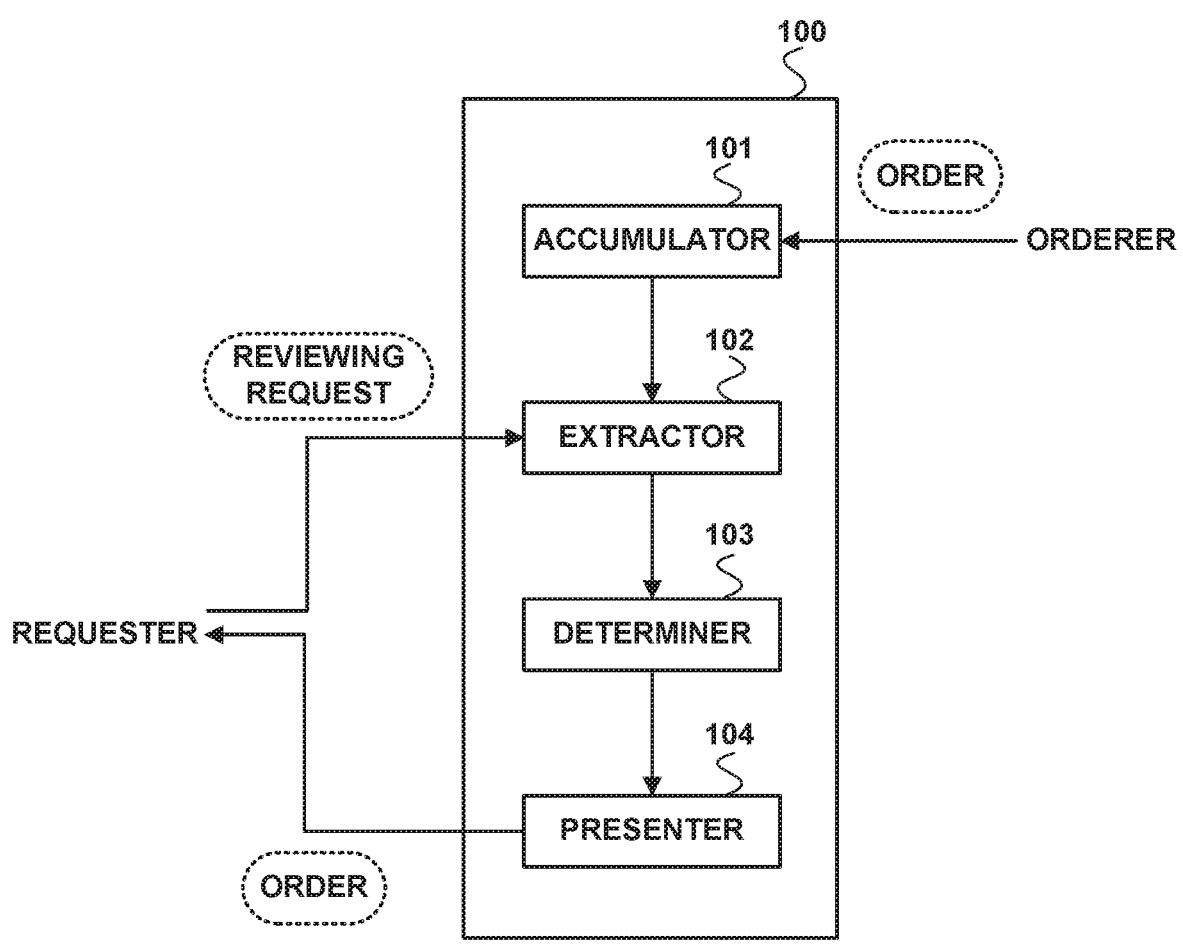
FIG. 4 is a diagram illustrating a functional configuration of an information processing apparatus according to a first embodiment.
Figure 7:
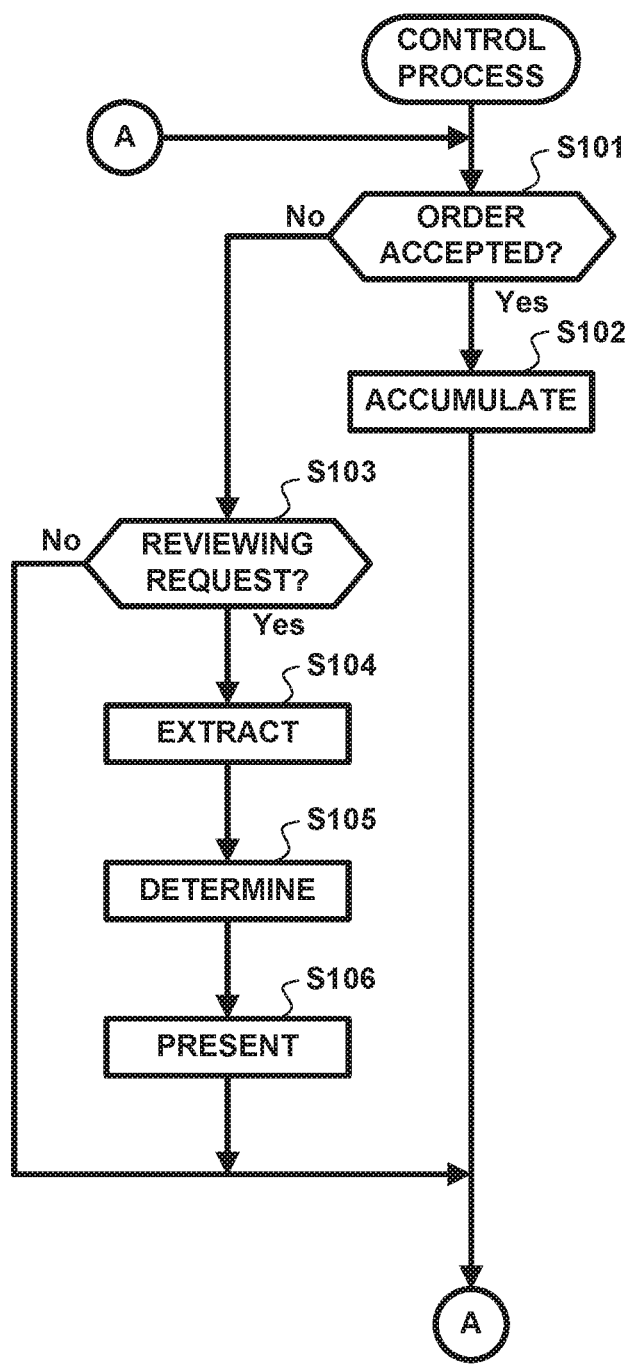
FIG. 7 is a flowchart to explain a control process executed by the information processing apparatus of the first embodiment.

As illustrated in FIG. 4, the information processing apparatus 100 includes an accumulator 101, an extractor 102, a determiner 103, and a presenter 104.

In this embodiment and embodiments to be discussed later, the CPU 601 functions as the accumulator 101, the extractor 102, the determiner 103, and the presenter 104.

The accumulator 101 accumulates, when an order for a commercial product is accepted, the accepted order in association with an unprocessed status.

For example, the RAM 603 of the information processing apparatus 100 stores an order history table 603a illustrated in FIG. 5.

The order history table 603a registers an order ID 603a1 for identifying an order placed in the electronic market, an order recipient (store ID) 603a2 that is selling a commercial product relating to that order, an orderer (customer ID) who has placed the order, an order time and date 603a4 at which the order has been placed, a commercial product ID 603a5 relating to the order, a purchased amount 603a6, and a process status 603a7 in association with one another. The listed items contained in the order history table 603a are not limited to the above examples, and for example, instead of or together with the purchased amount, a purchase quantity of the commercial products may be contained as an additional listed item.

For example, the first line in the order history table 603a in FIG. 5 indicates that "the order with the order ID "WWW" is an order from a customer A1 (customer ID "A1") for a commercial product aaa (commercial product ID "aaa") at a store X1 (store ID "X1"), has been placed by the customer A1 on Dec. 1, 2014 at 10:00 with a purchased amount of "JP 3000 YEN", and is not processed yet by the store X1".

For example, the accumulator 101 registers information (order ID 603a1 to purchased amount 603a6) on the details of an accepted order in the order history table 603a when accepting the order for the commercial product from the customer terminal 300, and registers the process status 603a7 as "unprocessed" so as to indicate that the order has not been processed yet.

When a browsing request is received, the extractor 102 extracts the order which was given to an order recipient that is a requester of the received request, and which is accumulated in association with the unprocessed status.

For example, a requester is a store (seller) that is selling commercial products in the electronic market, and the extractor 102 receives a browsing request for the accumulated orders from the store terminal 200 operated by the requester.

The extractor 102 refers to the order history table 603a, and extracts an order which was given to the order recipient that is the store having transmitted the browsing request, and which is associated with the unprocessed status.

When, for example, the requester is the store X1, the extractor 102 refers to the order history table 603a in FIG. 5, and extracts an order which has the order recipient (store ID) 603a2 that is "X1", and which also has the process status 603a7 that is "unprocessed".

The determiner 103 determines a priority of each extracted order based on the order which has the same orderer with each extracted order, and which is accumulated in association with the status other than the unprocessed status.

For example, the determiner 103 refers to the order history table 603a in FIG. 5, and identifies the order that has the process status 603a7 other than "unprocessed" for each orderer (for example, the customer A1, a customer A2, a customer A3) of an unprocessed order at the store X1. Next, for the customer A1 who is the orderer of the unprocessed order at the store X1, the order other than "unprocessed" at the store X1, and the order other than "unprocessed" at the other store like a store X2 (store ID "X2") are identified. The determiner 103 determines the priority of the order placed by the customer A1 to the store X1 based on those identified orders.

When, for example, there is a low possibility that a problem occurs with respect to an order processing at the store, and when the process can be completed within a short time and the order processing as soon as possible is preferable for both the customer and the store, the determiner 103 sets a high priority. Hence, for example, as for an order from a customer which was processed without any problem so far at one's own store or the other stores, and an order from a regular customer of one's own store, the determiner 103 sets a high priority. Conversely, when the store needs to pay special attention to the order fulfillment or needs time to handle the order, the determiner sets a low priority.

Example cases in which the store needs to pay special attention to the order fulfillment or needs time to handle the order are cases in which, for example, the purchased amount is abnormally high or the purchase quantity is abnormally large. In such cases, a consideration as for whether or not the customer can surely make payment is necessary without executing the process immediately. In addition, the store needs to check whether or not the availability of the commercial products can be guaranteed. Hence, in such cases, a low priority is set to prioritize other safe (a possibility that any problem occurs is low) orders, and such safe orders are processed quickly. This increases order processing efficiency at the store.

The determiner 103, for example, identifies an order with the highest purchased amount in the order history containing already-processed orders made by the customer A1 at store X1 and other stores, and when the purchased amount of the current order at the store X1 is larger than the purchased amount of the identified order, the priority for the current order is set to be lower than that of the unprocessed orders from other customers.

In addition, when the order placed by the customer A1 is an initial order at the store X1, or when the purchased amount of such an order is larger than the purchased amounts at other stores, the determiner 103 sets the priority of the order from the customer A1 to be lower than those of the unprocessed orders from other customers. In addition, when the purchase quantity in the order from the customer A1 at the store X1 is larger than the purchase quantities at other stores, the determiner 103 may set the priority of the order from the customer A1 to be lower than those of the unprocessed orders from other customers.

Alternatively, when the order placed by the customer A1 is an initial order at the store X1, and the purchased amount/the purchase quantity in such an order is larger than the average of the purchased amount/the average of the purchase quantity at the store X1, the determiner 103 may set the priority of the order from the customer A1 to be lower than those of the unprocessed orders from other customers.

In addition, for example, the determiner 103 sets the priority of each of the extracted orders based on a similarity between the order with the common orderer and the common order recipient to the extracted order, and the extracted order, and which is accumulated in association with the status other than unprocessed status.

The term similarity of order indicates a resemblance in the number of times and frequency of the orders, the purchased amount, the purchased quantity, and the like. The more the number of times of the order, the frequency of the orders, the purchased amount or the purchase quantity resemble each other, the higher the similarity becomes.

For example, the determiner 103 refers to the order history table 603a in FIG. 5, and identifies the order associated with the status other than the unprocessed status at the store X1 for the customer A1 who is the orderer of the unprocessed order at the store X1. The determiner 103 acquires the similarity between the identified past order having the status other than the unprocessed status from the customer A1 at the store X1 and the unprocessed order from the customer A1 at the store X1. When, for example, the order having the status other than the unprocessed status was placed on a particular day, and the unprocessed orders were placed 10 times in a particular hour, the similarity to be acquired is set as "low".

In addition, the determiner 103 likewise refers to the order history table 603a in FIG. 5, and identifies the order associated with the status other than the unprocessed status at the store X1 for the customer A2 who is the orderer of the unprocessed order at the store X1. The determiner 103 acquires the similarity between the identified past order having the status other than the unprocessed status from the customer A2 at the store X1 and the unprocessed order from the customer A2 at the store X1. When, for example, the order in the status other than the unprocessed status was placed on a particular day, and the unprocessed order was placed on a particular day, the similarity to be acquired is set as "high".

Note that how to calculate the similarity is optional. For example, a difference in the number of times or the purchased amount, and the like to be compared may be taken as the similarity, and multiple states may be set beforehand for the number of times, and the like, and the similarities ("high" to "low") may be associated with the respective stages.

The determiner 103 compares the similarity of the unprocessed order from the customer A1 with the similarity of the unprocessed order from the customer A2, and sets the priority of the unprocessed order from the customer A1 so as to be lower than that of the unprocessed order from the customer A2 since the similarity with respect to the customer A1 is low.

As explained above, the determiner 103 acquires the similarities for all unprocessed orders at the store X1 that is the requester, compares the similarities of the respective orders, and determines the priorities of all unprocessed orders accumulated at the time of the browsing request.

The presenter 104 presents the extracted orders to the requester in order of the determined priorities.

For example, the presenter 104 creates an unprocessed order table 603b as illustrated in FIG. 6, and transmits data on the unprocessed order table 603b to the store terminal 200 of the requester.

The unprocessed order table 603b has an order priority 603b1, an order ID 603b2, an orderer (customer ID) 603b3 who placed the order, an order time and date 603b4 at which the order was placed, an ordered commercial product ID 603b5, and a purchased amount 603b6 registered in association with one another. As for the priority, the smaller the value is, the higher the priority is.

When the requester (store) receives order information to which the priority is given, the store determines the sequence of the order fulfillment based on such information, and sequentially executes processes such as shipment.

According to this embodiment, when the store regularly processes the orders, the order that can be processed readily is displayed preferentially. In addition, the store processes the prioritized order first, and postpones the order that needs time to handle the order. Accordingly, the process efficiency at the store is improved, and thus the customer satisfaction from the client is enhanced. That is, the orders convenient for the store are presented thereto.

(4. Operation of Information Processing Apparatus of First Embodiment)

Next, an explanation will be given of an operation of the information processing apparatus 100 according to this embodiment. The information processing apparatus 100 starts a control process illustrated in FIG. 7, for example, upon reception of any data from the store terminal 200 or the customer terminal 300.

The accumulator 101 determines whether or not an order for a commercial product is accepted (step S101). When the accumulator 101 determines that the order for the commercial product is accepted (step S101; Yes), the accumulator 101 accumulates the accepted order in association with the unprocessed status (step S102). Conversely, when the accumulator 101 determines that no order for the commercial product has been accepted in the electronic market (step S101; No), the extractor 102 determines whether or not a browsing request is accepted (step S103).

When, for example, determining that an order from the customer is accepted, the accumulator 101 registers information on the order detail for the accepted order in the order history table 603a in FIG. 5, and registers the process status 603a7 as "unprocessed". Conversely, when determining that no order for the commercial product has been accepted, the extractor 102 determines from which store in the electronic market a browsing request for the order is made.

When the extractor 102 determines that the browsing request is accepted (step S103; Yes), the extractor 102 extracts the order which has the order recipient that is the requester of the accepted request, and which is accumulated in association with the unprocessed status (step S104). Conversely, when the extractor 102 determines that no reviewing request has been accepted (step S103; No), the process returns to step S101.

When, for example, the extractor 102 determines that a browsing request for the order is accepted from the store X1, the extractor extracts the unprocessed order that has the order recipient which is the store X1 from the order history table 603a in FIG. 5. Conversely, when the extractor 102 determines that no browsing request for the order has been accepted from any store, the process returns to step S101.

Next, the determiner 103 determines the priority of each extracted order based on the order which has the common order recipient to the extracted, and which is accumulated in association with any status other than the unprocessed status (step S105).

For example, the determiner 103 extracts orders that have the respective process statuses 603a7 other than "unprocessed" status among the orders from the respective orderers (customer A1, customer A2, and customer A3, and the like) of the unprocessed orders at the store X1 from the order history table 603a in FIG. 5. Next, the determiner 103 determines the priority of the unprocessed order from each orderer based on the order from each orderer in the status other than unprocessed.

The presenter 104 presents the extracted orders to the requester in order of the determined priority.

For example, as illustrated in FIG. 6, the presenter 104 presents, to the store X1, the unprocessed orders at the store X1 in order of the determined priorities.

(5. Functional Configuration of Information Processing Apparatus According to Second Embodiment)

An information processing apparatus according to a second embodiment registers an order processed by the store in association with a processed status, and determines the priority based on the processed order.

Figure 8:
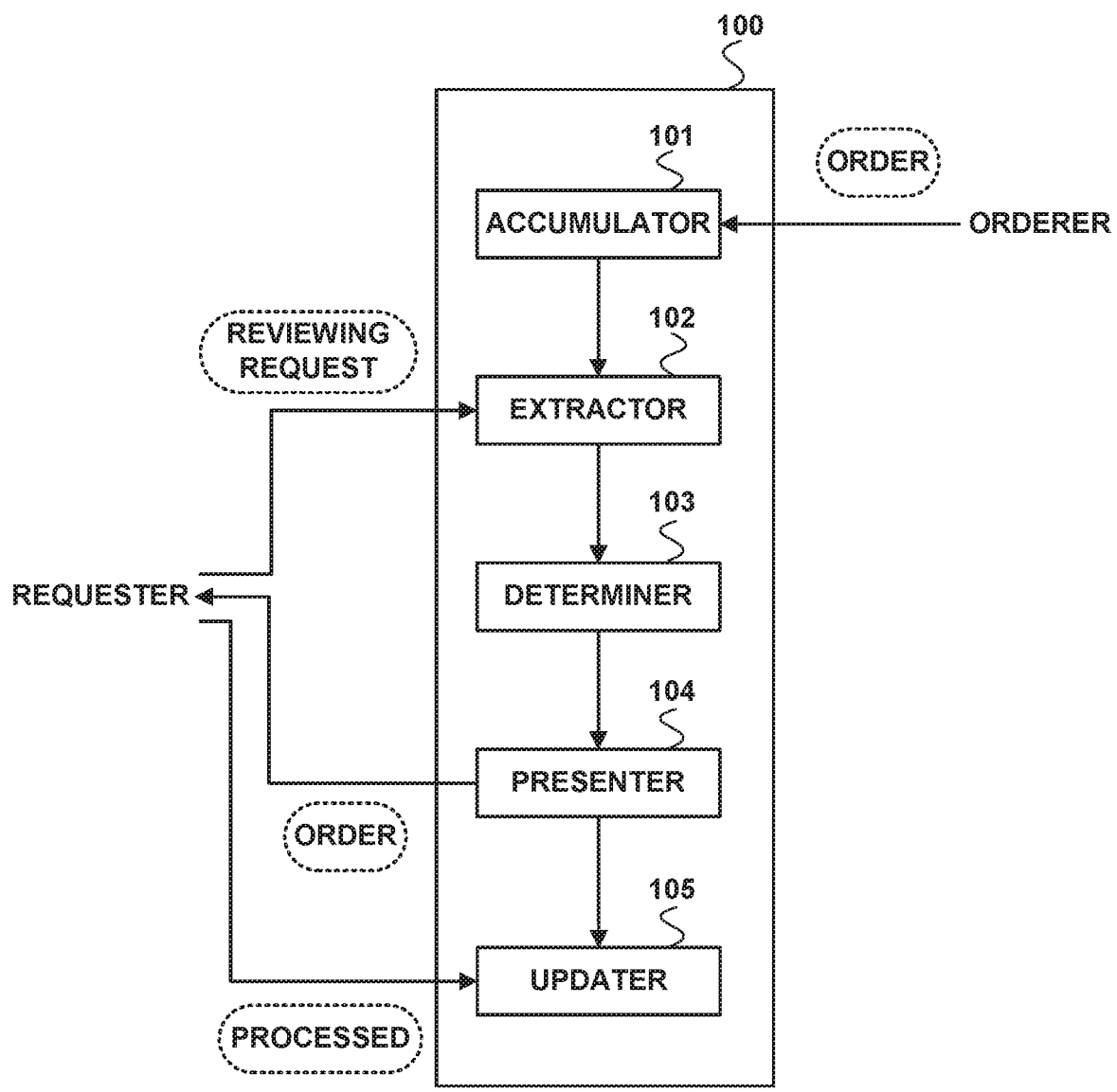
FIG. 8 is a diagram illustrating a functional configuration of an information processing apparatus according to a second embodiment.

As illustrated in FIG. 8, the information processing apparatus 100 includes an accumulator 101, an extractor 102, a determiner 103, a presenter 104, and an updater 105. In this embodiment, the accumulator 101, the extractor 102, and the presenter 104 have the same functions as those of the first embodiment. Hence, an explanation will be given below of the determiner 103 and the updater 105 that have different functions from the first embodiment.

The updater 105 updates the status associated with the order already processed by the requester among the presented orders to the processed status.

When, for example, the updater 105 receives a notification of process completion of an order by the store terminal 200 as for the unprocessed order in FIG. 6, the updater updates the listed item that is the process status 603a7 in the order history table 603a in FIG. 5 to "processed".

In this embodiment, the CPU 601 functions as the updater 105. Note that the same is true in the following embodiment.

The determiner 103 determines the priority of each of the extracted orders based on a frequency of the order which has the common orderer to the extracted order, and which is accumulated in association with the processed status.

For example, the determiner 103 refers to the order history table 603a in FIG. 5, and extracts the order with the process status 603a7 that is "processed" for each orderer (customer) of the unprocessed order at the store X1. Next, the determiner 103 acquires the frequency of the processed order of each customer, and sets the priority of the order in such a way that the higher the frequency is, the higher the priority of the order becomes.

For example, the frequency of the order (purchase) placed at the store X1 and other stores (for example, store Y) by the customer A1 who is the orderer of the unprocessed order at the store X1 is acquired. In addition, likewise, the frequency of the order placed at the store X1 and other stores by the customer A2 who is the orderer of the unprocessed order at the store X1 is acquired. Next, the determiner 103 sets the priority of the unprocessed order from the customer A2 so as to be higher than the priority of the unprocessed order from the customer A1 when the frequency of the order from the customer A2 is higher than the frequency of the order from the customer A1. In this way, as for all orderers of all unprocessed orders at the store X1, the frequency of the past order is acquired, and a setting is made in such a way that the higher the frequency of the order is, the higher the priority becomes.

According to this embodiment, the more the orderer frequently purchases commercial products in the electronic market, the more the order to be processed is preferentially presented. Since the orderer who frequently purchases commercial products has orders already processed multiple times, such an orderer can be estimated as a highly reliable customer. Hence, when the store processes the order first which has a low possibility that any problem occurs with respect to the order fulfillment, the process efficiency for the store is improved. In addition, since the orderer who frequency purchases the commercial products is a frequent customer for the electronic market, when the store becomes a favorite for such a customer, there is a greater likelihood that this customer will become a regular customer. Hence, even if the orderer is a customer who initially purchases at a given store, by executing the process preferentially for this orderer who frequently orders (purchases) commercial products, the customer's satisfaction is enhanced, and thus the number of regular customers can be increased.

In addition, the determiner 103 may determine the priority of each of the extracted orders based on a frequency of the order which has the common orderer and the common order recipient to the extracted order, and which is accumulated in association with the processed status.

That is, the determiner 103 determines the frequency of the past order for each orderer (customer A1, customer A2, and customer A3) at the store X1, and sets the priority in such a way that the higher the order frequency of the customer is, the higher the priority becomes.

Hence, an order from a regular customer for a store is presented with a higher priority than that of an order from a customer who is not a regular customer, and thus the regular customer for that store is preferentially processed.

(6. Operation of Information Processing Apparatus of Second Embodiment)

Figure 9:
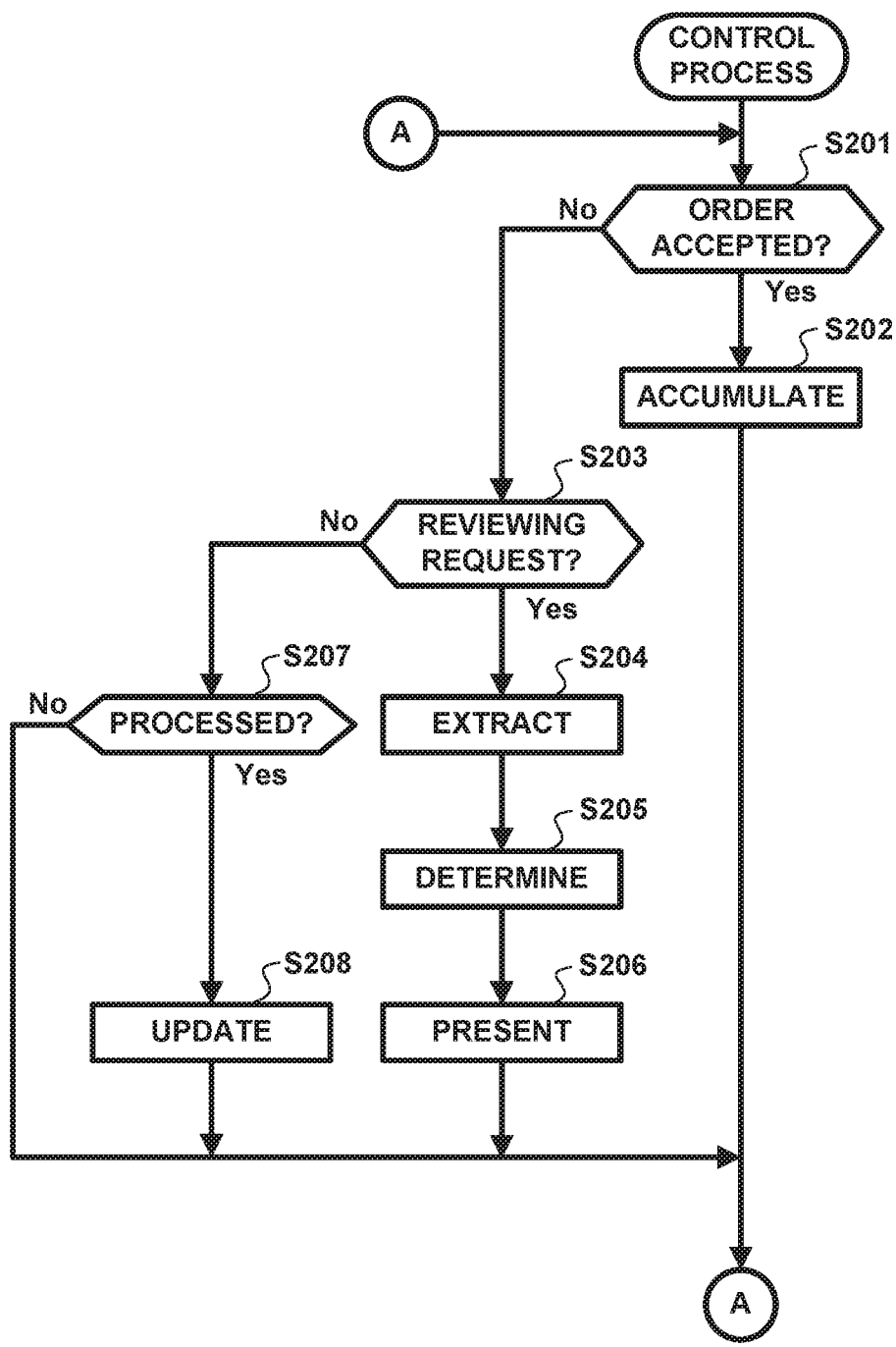
FIG. 9 is a flowchart to explain a control process executed by the information processing apparatus of the second embodiment.

Next, an explanation will be given of an operation of the information processing apparatus 100 of this embodiment. The information processing apparatus 100 starts a control process illustrated in FIG. 9, for example, upon reception of any data from the store terminal 200 or the customer terminal 300. Note that processes in steps S201 to S204 and S206 in the flowchart of FIG. 9 are the same as those in the steps S101 to S104 and S106 in the flowchart of FIG. 7. Hence, the explanation for those processes will be omitted.

In step S203, when the extractor 102 determines that no browsing request has been received (step S203; No), the updater 105 determines whether or not a notification of process completion has been received (step S207). When the updater 105 determines that the notification of process completion has been received (step S207; Yes), the updater 105 updates the status associated with an order processed by the requester among the presented orders to the processed status (step S208). After the update operation, the process returns to step S201. Conversely, when the updater 105 determines that the notification of process completion has not been received (step S207; No), the process returns to step S201.

For example, the updater 105 determines whether or not a notification of process completion for the presented unprocessed order (process completion notification) has been received from the store to which the unprocessed orders with respective priorities are presented. When, for example, the updater 105 receives a notification of process completion for the order of the customer A1 from the store X1, with respect to the order relating to this notification, the updater 105 updates the process status 603a7 in the order history table 603a in FIG. 5 to "processed".

In addition, in step S205, the determiner 103 determines the priority of each extracted order based on the frequency of an order which has the common orderer to each extracted order, and which is accumulated in association with the processed status (step S205). When, for example, the information processing apparatus 100 accepts an order from the customer A1 for a commercial product available at the store X2 and subsequently receives the browsing request from the store X2 for this order, the determiner 103 determines the priority of the order to be presented to the store X2 based on the frequency of past orders including the processed order from the customer A1 at the store X1, and the like. Next, the presenter 104 presents the unprocessed orders at the store X2 to the store X2 in order of the determined priorities.

(7. Functional Configuration of Information Processing Apparatus of Third Embodiment)

An information processing apparatus according to a third embodiment registers a canceled order in association with a canceled status, and determines the priority based on the infrequency of order canceling.

The updater 105 updates the status associated with a canceled order among the accumulated orders in association with the unprocessed status to a canceled status.

For example, after orders from the customer are accepted and accumulated, when the updater 105 receives a notification of order cancellation from that customer, the updater 105 updates the listed item that is the process status 603a7 in the order history table 603a in FIG. 5 to "canceled".

The determiner 103 determines the priority of each of the extracted orders based on an infrequency of the order which has the common orderer to the extracted order, and which is accumulated in association with the canceled status.

The term infrequency is an index indicating whether or not order canceling is infrequent. The higher the infrequency is, the rarer the cancellation is.

The determiner 103 determines the infrequency of the order, for example, based on the frequency of order cancelation made by the orderer (customer) and a cumulative number of times of order cancellation in the electronic market. In the following explanation, the smaller the frequency of order cancellation is, the higher the infrequency becomes.

The determiner 103 acquires how many times the customer A1 who is the orderer of an unprocessed order at the store X1 canceled past orders at the store X1 and other stores within a predetermined time period. Likewise, the frequency of order cancellation is acquired for the other customers (customer A2, customer A3, and the like) of unprocessed orders at the store X1. Next, when determining that the frequency of order cancellation by the customer A2 is smaller than that of the customer A1, that is, the infrequency of the order from customer A2 is higher, the determiner 103 sets a higher priority to the order from the customer A2 than the priority to the order from the customer A1. As explained above, the infrequencies of the orders from the respective customers are compared with each other, and the priority is acquired based on the result.

According to this embodiment, orders are presented in such a way that an order which is infrequently canceled should be preferentially processed. The store preferentially processes the order with a lower possibility of order cancellation during the fulfillment, thus preventing against unnecessary shipping work and the like f.

Note that the determiner 103 may determine the priority of each of the extracted orders based on an infrequency of the order which has the common orderer and the common order recipient to the extracted order, and which is accumulated in association with the canceled status.

For example, the determiner 103 acquires how many times the customer A1 who is the orderer of the unprocessed order at the store X1 canceled the past order at the store X1. Likewise, the number of times of order cancellation is acquired for the other orderers of the unprocessed orders at the store X1. Eventually, the determiner 103 compares the infrequencies of orders from the respective customers to one another, thereby acquiring the priority.

Hence, orders are presented in such a way that the priority for the customer who has a higher incidence of order cancellation in the past at a store that is the requester is decreased.

In addition, the updater 105 may receive a notification of order cancellation from the store, and may update the accumulated unprocessed order in association with a canceled status.

Still further, the determiner 103 sets a higher priority for the orderer of an order registered in association with a canceled status due to the cancellation by the store.

According to this configuration, when a customer of an order that was canceled due to the inconvenience of the store utilizes that store again, such an order will be preferentially processed. Hence, the customer's satisfaction is improved.

(8. Operation of Information Processing Apparatus of Third Embodiment)

Figure 10:
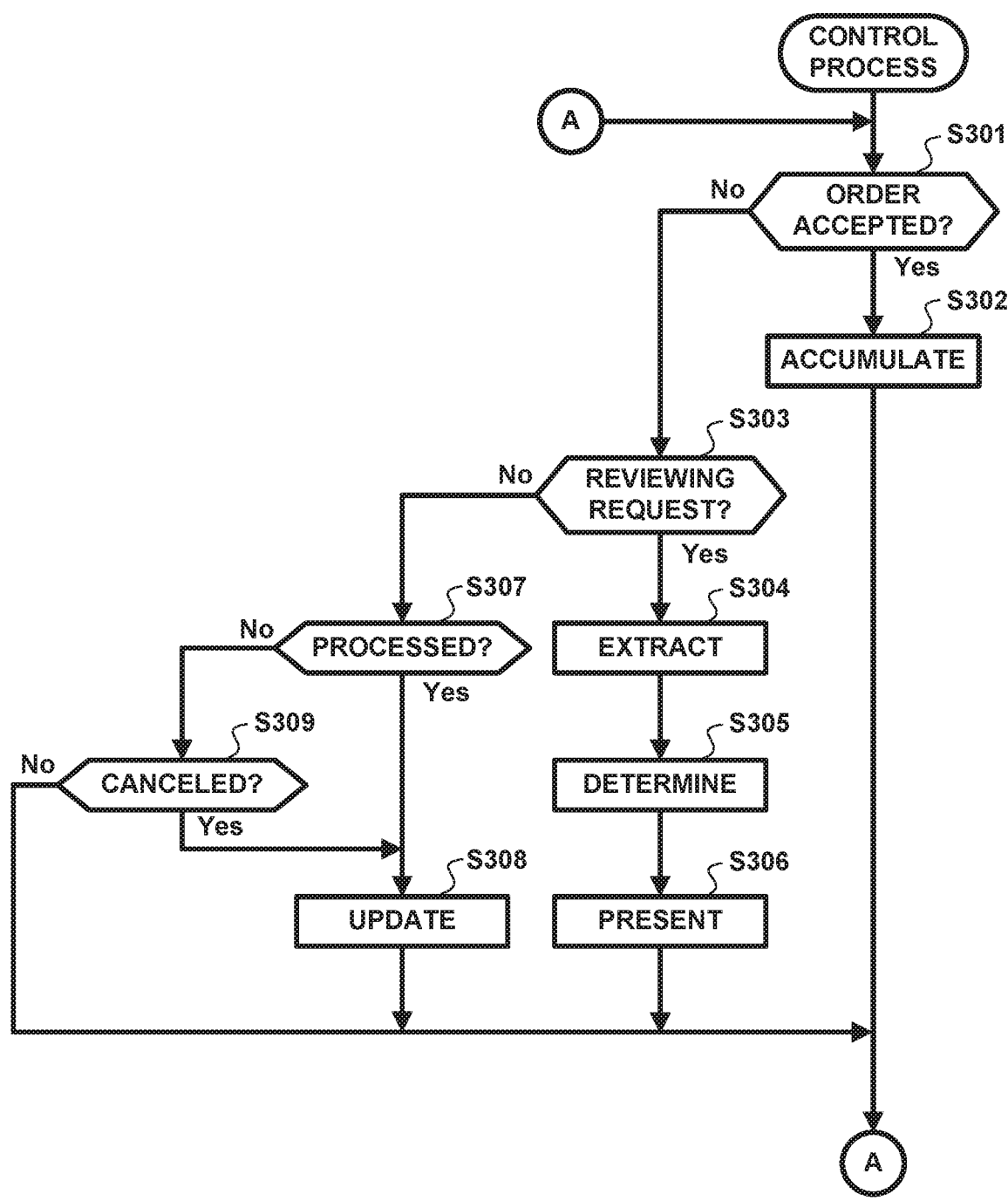
FIG. 10 is a flowchart to explain a control process executed by an information processing apparatus according to a third embodiment.

Next, an explanation will be given of an operation of the information processing apparatus 100 according to this embodiment. The information processing apparatus 100 starts a control process illustrated in FIG. 10, for example, upon reception of any data from the store terminal 200 or the customer terminal 300. Note that processes in steps S301 to S304 and S306 in the flowchart of FIG. 10 are the same as the processes in steps S101 to S104, S106 in the flowchart of FIG. 7. In addition, a process in a step S307 in the flowchart of FIG. 10 is the same as the process in step S207 in FIG. 9. Hence, the explanation for those processes will be omitted.

In step S307, when the updater 105 determines that no notification of process completion has been received (step S307; No), the updater 105 determines whether or not a notification of order cancellation has been received (step S309). When the updater 105 determines that the notification of order cancellation has been received (step S309; Yes), the updater 105 updates an order accumulated in association with the unprocessed status to a canceled status (step S308). After updating, the process returns to step S301. Conversely, when the updater 105 determines that no notification of order cancellation has been received (step S309; No), the process returns to step S301.

When, for example, receiving a notification of order cancellation for a commercial product available at the store X1 from the customer A1, with respect to the order relating to this notification, the updater 105 updates the listed item that is the process status 603a7 in the order history table 603a in FIG. 5 to "canceled".

In addition, in step S305, the determiner 103 determines the priority of each extracted order based on the infrequency of the order which has the common orderer to each extracted order, and which is accumulated in association with the canceled status (step S305). When, for example, the information processing apparatus 100 accepts an order from the customer A1 for a commercial product available at the store X2, and, after that, receives a browsing request from the store X2 for this order, the determiner 103 determines the priority of the order to be presented to the store X2 based on the infrequencies of past orders including an order associated with the canceled status from the customer A1 at the store X1. Next, the presenter 104 presents, to the store X2, the unprocessed orders at the store X2 in order of the determined priorities.

The information processing apparatus 100 was explained above in the first to third embodiments, respectively, but those embodiments permit an arbitrary combination of those configurations as needed.

REFERENCE SIGNS LIST

100 Information processing apparatus
101 Accumulator
102 Extractor
103 Determiner
104 Presenter
105 Updater
200, 201, 202 to 20m Store terminal
300, 301, 302 to 30n Customer terminal
400 Internet 500 Shopping server
600 Information processing apparatus
601 CPU
602 ROM
603 RAM
604 NIC
605 Image processor
606 Sound processor
607 DVD-ROM drive
608 Interface
609 External memory
610 Controller
611 Monitor
612 Speaker

The invention claimed is:

1. An information processing device comprising: at least one memory configured to store computer program code; and at least one processor configured to access the at least one memory and operate as instructed by the computer program code, the computer program code including:
   first presenter code configured to cause the at least one processor to present a plurality of orders in association with an unprocessed status to a requester in a first order based on a first browsing request from the requester;
   accumulator code configured to cause the at least one processor to accumulate, when an order for a commercial product is accepted, the accepted order in association with the unprocessed status into a storage storing accumulated orders;
   receiving code configured to cause the at least one processor to identify whether a second browsing request is received from the requester that indicates a request to display unprocessed orders corresponding to the requester;
   extractor code configured to cause the at least one processor to extract, based on the receiving code identifying the second browsing request has been received, orders sent to the requester from among the accumulated orders associated with the unprocessed status in the storage;
   determination code configured to cause the at least one processor to identify, for each of the extracted orders, orders sent by an orderer of said each of the extracted orders, from among the accumulated orders associated with a status other than the unprocessed status in the storage, and determine priorities of the extracted orders based on the identified orders respectively;
   second presenter code configured to cause the at least one processor to present the extracted orders to the requester in a second order based on the determined priorities and preferentially execute shipment of the extracted orders in the second order; and
   update code configured to cause the at least one processor to identify, based on the receiving code identifying the second browsing request has not been received, whether a notification of process completion has been received from the requester that indicates a corresponding order, from among the accumulated orders in the storage, has been processed for shipment by the requester, and change the status of the corresponding order from the unprocessed status to a processed status.

2. The information processing device according to claim 1, wherein the determination code is further configured to cause the at least one processor to determine each of the priorities based on a similarity between each of the extracted orders and the identified orders for said each of the extracted orders.

3. The information processing device according to claim 1, wherein the determination code is further configured to cause the at least one processor to identify the identified orders from among the accumulated orders associated with the processed status in the storage, and determine each of the priorities based on a frequency of the identified orders.

4. The information processing device according to claim 1, wherein the determination code is further configured to cause the at least one processor to identify the identified orders from orders being accumulated in association with the processed status in the storage, and determine each of the priorities based on a frequency of the identified orders sent to the requester.

5. The information processing device according to claim 1, wherein the update code is further configured to cause the at least one processor to update, when the order has been canceled, the status of the corresponding order from the unprocessed status to a canceled status.

6. The information processing device according to claim 5, wherein the determination code is further configured to cause the at least one processor to identify the identified order from among the accumulated orders associated with the canceled status in the storage, and determine each of the priorities based on a frequency of the identified orders.

7. The information processing device according to claim 5, wherein the determination code is further configured to cause the at least one processor to identify the identified order from among the accumulated orders associated with the canceled status in the storage, and determine each of the priorities based on a frequency of the identified orders with order sent to the requester.

8. The information processing device according to claim 1, wherein the first browsing request from the requester indicates a request to display unprocessed orders corresponding to the requester.

9. A control method to be executed by at least one processor of an information processing apparatus, the control method comprising:
   presenting a plurality of orders in association with an unprocessed status to a requester in a first order based on a first browsing request from the requester;
   accumulating, when an order for a commercial product is accepted, the accepted order in association with the unprocessed status into a storage storing accumulated orders;
   identifying whether a second browsing request is received from the requester that indicates a request to display unprocessed orders corresponding to the requester;
   extracting, based on the identifying indicating the second browsing request has been received, orders sent to the requester from among the accumulated orders associated with the unprocessed status in the storage;
   identifying, for each of the extracted orders, orders sent by an orderer of said each of the extracted orders, from among the accumulated orders associated with a status other than the unprocessed status in the storage;
   determining priorities of the extracted orders based on the identified orders respectively;
   presenting the extracted orders to the requester in a second order based on the determined priorities;
   preferentially executing shipment of the extracted orders in the second order;
   identifying, based on the identifying indicating the second browsing request has not been received, whether a notification of process completion has been received from the requester that indicates a corresponding order, from among the accumulated orders in the storage, has been processed for shipment by the requester; and changing, based on the notification of process completion being received, the status of the corresponding order from the unprocessed status to a processed status.

10. One or more non-transitory storage mediums storing computer readable instructions, the computer readable instructions, when executed by one or more processors, causing the one or more processors to:

present a plurality of orders in association with an unprocessed status to a requester in a first order based on a first browsing request from the requester;

accumulate, when an order for a commercial product is accepted, the accepted order in association with the unprocessed status into a storage storing accumulated orders;

identify whether a second browsing request is received from the requester that indicates a request to display unprocessed orders corresponding to the requester;

extract, based on the second browsing request having been received, orders sent to the requester from among the accumulated orders associated with the unprocessed status in the storage;

identify, for each of the extracted orders, orders sent by an orderer of said each of the extracted orders, from among the accumulated orders associated with a status other than the unprocessed status in the storage;

determine priorities of the extracted orders based on the identified orders respectively;

present the extracted orders to the requester in a second order based on the determined priorities;

preferentially execute shipment of the extracted orders in the second order:

identify, based on the second browsing request not having been received, whether a notification of process completion has been received from the requester that indicates a corresponding order, from among the accumulated orders in the storage, has been processed for shipment by the requester; and change, based on the notification of process completion being received, the status of the corresponding order from the unprocessed status to a processed status.

* * * * *